Figure 1:
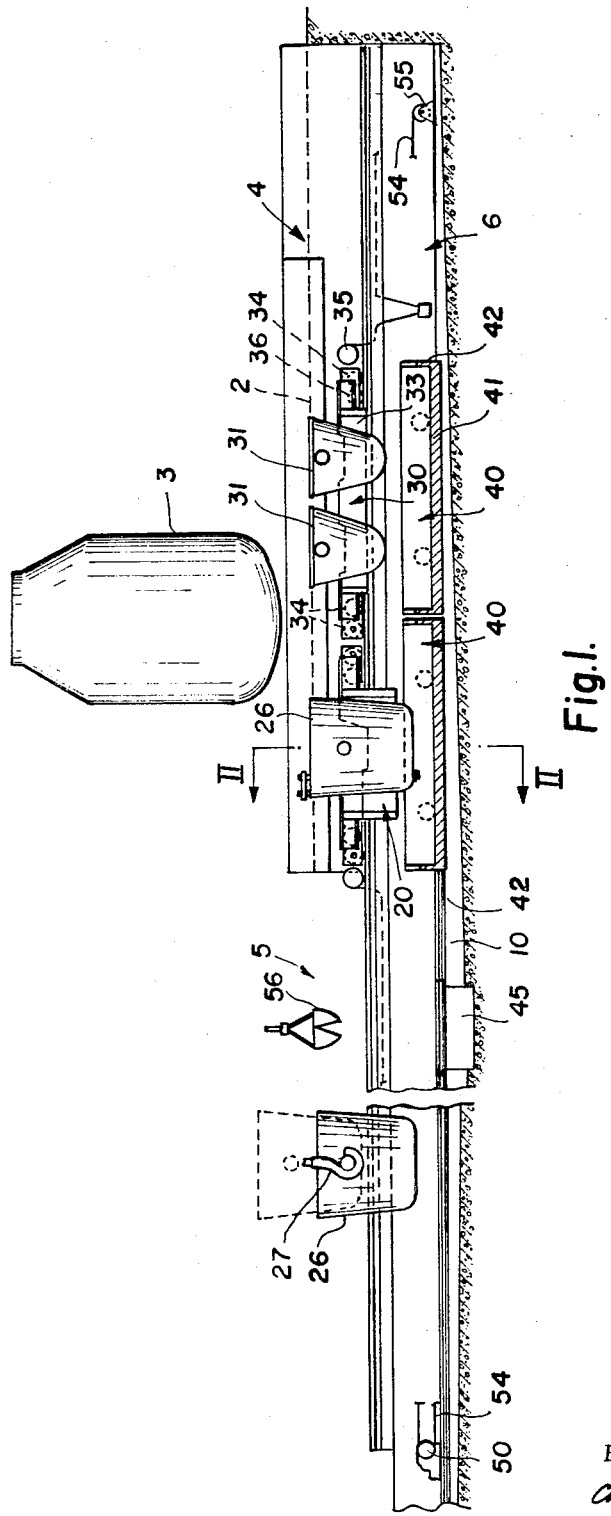

April 30, 1968   E. A. MEVISSEN ET AL   3,380,726
BASIC OXYGEN FURNACE PLANT

Filed March 8, 1966   2 Sheets-Sheet 1

INVENTORS
ERNST A. MEVISSEN
IRA W. LAKIN
BY
Christy, Parmelee &
Strickland
their ATTORNEYS April 30, 1968  E. A. MEVISSEN ET AL  3,380,726

BASIC OXYGEN FURNACE PLANT

Filed March 8, 1966  2 Sheets-Sheet 2

INVENTORS
ERNST A. MEVISSEN
IRA W. LAKIN
BY
Christy, Parmelee & Strickland
their ATTORNEYS

United States Patent Office 3,380,726
Patented Apr. 30, 1968

3,380,726
BASIC OXYGEN FURNACE PLANT
Ernst A. Mevissen, Coraopolis, and Ira W. Lakin, Volant, Pa., assignors to Dravo Corporation, Pittsburgh, Pa., a corporation of Pennsylvania
Filed Mar. 8, 1966, Ser. No. 534,982
7 Claims. (Cl. 266—13)

This invention is for an improvement in a plant for the production of steel in a so-called basic oxygen or B.O. furnace, and relates particularly to a plant arrangement designed for the travel of a ladle and one or more slag pots from a receiving position below the furnace to a teeming or other area removed from the receiving position according to customary practice, but at the same time provide for the collection and removal of rubble of various kinds.

In a B.O. furnace plant, it is common to provide a trench below the furnace which reaches from the loading platform at one side of the furnace, alongside the furnace and beyond the furnace on the other side to an area where the ladle is lifted by a crane and its contents poured or teemed into ingot molds, or from which the ladle may be transported to another location for discharge of its contents. In this area also the slag pots may be lifted by a crane and replaced with other pots, or the same pots replaced after dumping their contents. The ladle is carried from one area to another along the trench by a self-propelled ladle transfer car and the slag pots are carried on a generally similar car. Usually both cars move along the same track.

When the basic oxygen furnace has completed a heat of steel, the steel is poured into the ladle which is then on the transfer car at a position below the furnace while the car with the slag pots is positioned in the loading platform end of the trench. After the steel has been poured into the ladle, the ladle car is run out into the teeming area and the slag pots are removed into the receiving position below the furnace and the slag is run out of the furnace into these pots, which are then also moved to the teeming area, or sometimes back to the loading end of the trench, and the furnace is ready for recharging.

After a number of heats, the furnace must be relined, requiring removal of a large amount of refractory material. The operating span of the furnace from one relining to the next is referred to as a campaign, and it is of course desirable that operations proceed with minimum interruption during a campaign.

It happens, however, that during a campaign, slag will be spilled into the pit; some molten steel may be spilled, and broken refractory falls into the pit. In preparing the furnace for relining much of the damaged refractory removed from the furnace may be dumped into the pit. The removal of all this material, herein referred to as rubble, is often a time-consuming operation and frequently a bulldozer or plow of some kind must be used, even during a campaign, to either remove the rubble or level it off. A workman who must enter the pit, especially during a heat, is exposed to great hazards. The removal of rubble is increasingly recognized as a serious problem, especially where molten slag is involved.

The present invention provides for the effective collection and removal of the rubble without substantially in any way interfering with the normal operations of the furnace. This is accomplished by a dual track arrangement in the trench so arranged that relatively shallow trays or rubble cars may move along the trench under the ladle car and slag pots. It thus becomes possible to accumulate rubble directly in these movable trays or cars, and when a tray or car is full, it may be moved to the teeming area end of the trench for unloading.

The principal object of the invention is to provide in a basic oxygen furnace plant an arrangement for the collection and disposition of rubble with little or no interference with other operations during the campaign and without requiring workmen to remain in the pit.

Figure 2:
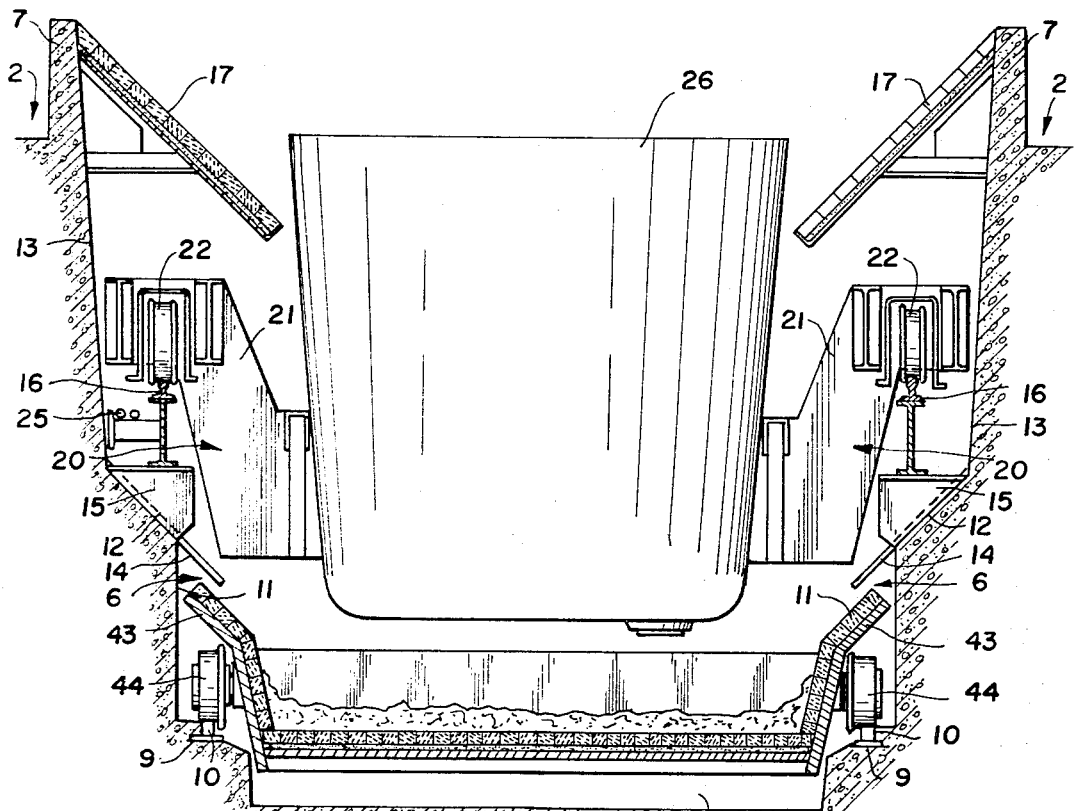
Figure 3:
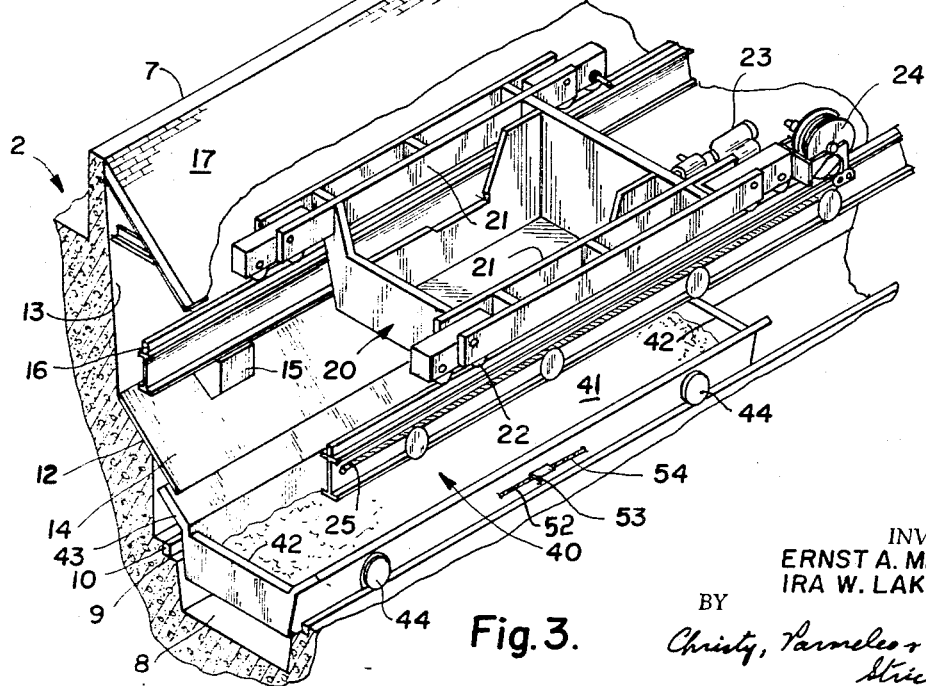

The invention may be more fully understood by reference to the accompanying drawing in which:

FIG. 1 is a diagrammatic view in the nature of a longitudinal section along the trench or pit;
FIG. 2 is a vertical section in the plane of line II—II of FIG. 1, but on a larger scale; and
FIG. 3 is a fragmentary perspective view with one side wall of the pit removed.

Referring to the drawings in more detail, 2 designates a raised foundation on which a basic oxygen furnace schematically indicated at 3 is supported. The foundation extends to the right of the furnace as viewed in FIG. 1 to provide what may be generally referred to as a charging area 4, and extending for a considerable distance to the left of the furnace along which there is a platform 5 providing what may be termed a teeming area because it is in this area that the contents of the ladle are usually teemed or poured into ingot molds, the ladle being lifted from its car in this area by a crane and raised to a suitable level. In many cases the ladle may, however, be transported by the crane to a more remote area, as for example where its contents are to be discharged into a continuous casting mold. The length of the trench will vary, but typically it may be a hundred feet or more.

Extending along the front of the foundation and platform as viewed in FIG. 1 is a narrow pit or trench 6 that is below normal ground level. The portion of this trench directly below the furnace is herein referred to as the furnace area, the portion to the right, the charging area, and the portion to the left is called the teeming area. As best seen in FIG. 2, the foundation 2 has a parapet wall 7 along the furnace area.

The bottom of the trench provides a runway along which shallow trays or rubble cars may be moved. Preferably the construction best shown in FIGS. 2 and 3 is provided wherein the pit or trench has a narrow channel portion 8 at the bottom, termed a spillage ditch. The sides of the trench at the top of the ditch have a ledge portion 9 at each side and a rail 10 is carried on each ledge. There is a vertical side wall 11 extending up from the ledge 9 to a second offset 12 where the aisle widens out still further to a vertically-extending wall 13.

The second offset or ledge 12 has a sloping apron or plate 14 that projects outwardly beyond the side wall 11 so as to overhang the ledge 9. Pillow blocks 15 at intervals along each plate 14 on the opposite walls of the trench support a second pair of rails 16 at a level above the rails 10. There is a refractory covered apron 17 that slopes downwardly into the pit from the parapet 7 and which extends over the rail 16 on one or both sides of the trench, but especially the furnace side, and which is spaced above this rail 16. The apron projects far enough into the trench so that if molten slag is poured onto it, the slag will fall clear of either of the rails 10 or 16.

There is a ladle transport car, designated generally as 20, having a frame structure 21 and wheels 22 that travel on the upper rails 16. This car is self-propelled by an electric drive schematically indicated at 23, and 24 indicates an electric cable reel for an electric cable 25, but some other arrangement may be provided for supplying power to the car. The ladle 26 sets in the frame 21 of the car and it can be lifted from the car, as schematically indicated by the crane hook 27 over the teeming area. According to this invention, the frame of the car is underslung so that the bottom of the ladle is well below the level of the rails 16. This gives adequate clearance between the rails 16 and the lower rails 10 without need to increase the depth of the pit beyond that normally provided.

There is a slag pot transfer car, designated 30, which also travels on the upper rails 16 and which carries one, and preferably two slag pots 31. These are set into the frame structure 33 of the car and the car has wheels 34 that engage the rails 16. This car is also self-propelled similar to the ladle car, its power cable reel being indicated at 35, and its drive at 36. The slag pots may be lifted from and replaced in the slag car in the same manner that the ladle may be lifted from and returned to the ladle car, and these cars also have the ladle supporting frame underslung so that the bottoms of the slag pots are below the rails 16.

According to this invention there are one or more, preferably two, elongated rubble trays or cars 40. As here shown they have a bed 41, end walls 42, outwardly-flaring side walls 43, and wheels support the rubble cars for travel on the lower rails 10, and the overall height of the rubble cars is such that they may pass freely under the ladle and slag pot cars, even though they be filled and even heaped with rubble. The interior of the rubble cars is covered with refractory, such as refractory brick cemented into place. The bed of the cars is underslung so that it is below the rails 10 but clear of the bottom of the pit, and provides under the cars the spillage ditch 8 that slopes endwise from each end of the trench downwardly toward a cross ditch 45 that is commonly provided in plants of this kind, and to which a cross ramp (not shown) usually leads. It is desirable, however, that there is a clearance space under the beds of the rubble cars so that air can circulate under these cars to accelerate the cooling of molten slag that may be spilled into them. Moreover, the rails for the rubble cars are elevated above this ditch clear of any rubble that may fall into the ditch and not be initially caught on a rubble car. In other words, it assures that there will be a clean track for these cars. The flaring side walls of the cars extend under the apron or shield 17 and also under the shield or apron 14. This arrangement assures that the rubble cars will receive any slag and most other material that falls or spills from the furnace area into the pit. Also both sets of rails and the trucks for all of the several cars are protected from any falling material and are kept clear of debris.

The rubble cars could be self-propelled, but preferably a winch and cable arrangement is cheaper and otherwise preferable. In the drawings, 50 designates a double-drum winch mounted in the left end of the aisle as viewed in FIG. 1. Such a winch may wind one cable at the same rate as it unwinds the other. A cable 52 extends along one side of the aisle and hooks to an eye 53 at one side of the rubble car, and a second cable 54 is hooked into this eye, passes around an idler sheave 55 at the right end of the aisle and back to the other drum of the winch. Assuming the two rubble cars to be coupled together, they will move as a unit, but if they are uncoupled, one rubble car can be pulled from beneath the furnace area to the teeming area to be unloaded, the cable ends unhooked, and the hooks may be carried back to the other car by the ladle car. The rubble cars may be unloaded in any suitable manner. A grab bucket is indicated at 56 for this purpose, but provision may be made to lift them entirely out of the aisle, as for example by a crane.

The rubble cars, or at least one of them, if one is of sufficient length, may normally be located in the trench below the furnace during the campaign, and in this position will collect slag or steel may be spilled. The slag pots may be moved to the charging end of the trench when the ladle car is in receiving position. When a heat of steel has been poured into the ladle, the ladle car is run out to the teeming area end of the trench and the slag pots are brought into position to receive slag. If, during the campaign, the rubble cars become loaded, they may be pulled into the teeming area end of the trench, or to the opposite end, unloaded, and moved back with little interruption to normal operation. During the relining of the furnace the slag pots and ladle car may be moved clear of the furance area and rubble may fall or drop onto the rubble cars, so that the task of cleaning the spillage ditch is facilitated. There is little need for a worker to be in the pit for any length of time during a campaign, or when the furnace is down.

While the drawings show the upper track for the ladle cars extending to near the end of the teeming area, it is not necessary that they be coextensive with the trench and may terminate short of the distance which the rubble cars or trays travel to facilitate removal of the trays if they are lifted out by a crane, or the vertical distance above the bottom of the ditch may be sufficient for use of a high lift truck in the trench if this method of unloading the trays is used.

The invention is adaptable to existing plants with relatively little expense. It will of course be understood that various changes and modifications may be made from one furnace to another within the contemplation of the invention and under the scope of the following claims.

We claim:

1. In a basic oxygen furnace plant having a foundation area where a basic oxygen furnace is located with an elongated trench therebelow extending in each direction beyond the foundation, the invention comprising:
  (a) an upper trackway extending along the trench,
  (b) a ladle car and a slag pot car movable along said upper trackway,
  (c) a ladle removably carried in the ladle car and a slag pot removably carried in the slag pot car,
  (d) a runway extending along the trench below the upper trackway,
  (e) a rubble receiving tray movable along said runway at a level below the ladle and slag pots on said cars whereby it may be positioned under said cars when the furnace is discharging into the ladle and slag pot, respectively, to collect any spillage, and
  (f) means for moving the tray along the runway.

2. In a basic oxygen furnace plant as defined in claim 1, wherein the said runway comprises a lower trackway under the upper trackway and the rubble tray is an elongated shallow car having wheels engaging the trackway.

3. In a basic oxygen furnace as defined in claim 2 wherein the trench has side walls, characterized by the upper trackway being formed by a rail extending along each side wall with the ladle car and slag pot car spanning the width of the trench from one rail to the other and the lower trackway being provided by a rail extending along each side wall above the bottom of the trench, with the rubble car spanning the width of the trench between said last-named rails, the rubble car having a bed which is clear of the bottom of the trench.

4. In a basic oxygen furnace plant, the invention as defined in claim 3 wherein the last-named rails are closer together than the upper rails and the rubble car has a bed with side and end walls, the tops of the side walls being flared outwardly, the side wall of the trench below the furnace on at least the furnace side having an apron extending from the side wall downwardly and inwardly over the trench sufficiently to overhang both rails at that side of the trench and the flared side wall of the rubble car at the same side.

5. In a basic oxygen furnace plant, the invention as defined in claim 3 wherein the last-named rails are closer together than the upper rails and the rubble car has a bed with side and end walls, the tops of the side walls being flared outwardly, the side walls of the trench below the furnace on both sides having downwardly-extending aprons projecting therefrom that overhang the rails and the flaring sides of the rubble car.

6. In a basic oxygen furnace plant as defined in claim 3 wherein:
  (g) The ladle car is constructed to removably support a ladle with the bottom of the ladle below the level of the rails on which said car travels.

7. In a basic oxygen furnace plant as defined in claim 3 wherein:
 (g) the ladle car is constructed to removably support a ladle with the bottom of the ladle below the level of the rails on which said car travels,
 (h) the rubble car having a bed with a bottom and side and end walls, the side walls being higher than the end walls and flaring outwardly at each side of the car, the bottom and portions of the side and end walls being below the level of the rails on which the rubble car travels.

References Cited
UNITED STATES PATENTS

| | | | |
|---|---|---|---|
| 331,267 | 11/1885 | Williamson | 266—36 |
| 2,696,663 | 12/1954 | Wright et al. | 266—13 |
| 3,026,102 | 3/1962 | McFeaters | 266—15 XR |
| 3,141,916 | 7/1964 | McFeaters et al. | 266—13 |

J. SPENCER OVERHOLSER, *Primary Examiner.*

R. S. ANNEAR, *Assistant Examiner.*